(12) United States Patent
Stocchiero

(10) Patent No.: US 7,228,875 B2
(45) Date of Patent: Jun. 12, 2007

(54) SEAL AND BLEED VALVE UNIT FOR ELECTRIC BATTERIES

(76) Inventor: Franco Stocchiero, Via Giacomo Zanella, 34/A, 36050 Montorso Vicentino (VI) (IT)

( * ) Notice: Subject to any disclaimer, the term of this patent is extended or adjusted under 35 U.S.C. 154(b) by 410 days.

(21) Appl. No.: 10/494,262

(22) PCT Filed: Nov. 14, 2002

(86) PCT No.: PCT/IB02/04758

§ 371 (c)(1),
(2), (4) Date: Apr. 30, 2004

(87) PCT Pub. No.: WO03/043106

PCT Pub. Date: May 22, 2003

(65) Prior Publication Data

US 2005/0005979 A1    Jan. 13, 2005

(30) Foreign Application Priority Data

Nov. 14, 2001  (IT)  ............................. VI2001A0240

(51) Int. Cl.
- F16K 15/14 (2006.01)
- F16K 24/04 (2006.01)
- H01M 2/12 (2006.01)

(52) U.S. Cl. ............ 137/860; 137/512.15; 220/203.29; 251/333; 361/521; 429/54

(58) Field of Classification Search ........... 137/512.15, 137/512.4, 853, 860; 429/54, 55, 89; 220/203.29; 361/521; 251/333

See application file for complete search history.

(56) References Cited

U.S. PATENT DOCUMENTS

| 4,576,879 A | * | 3/1986 | Nakazawa et al. ............ 429/86 |
| 5,455,124 A | | 10/1995 | Schollenberger |

FOREIGN PATENT DOCUMENTS

| EP | 0756338 | 1/1997 |
| FR | 2087323 | 12/1971 |
| JP | 59191260 | 10/1984 |
| JP | 60017856 | 1/1985 |
| JP | 05074433 | 3/1993 |
| JP | 10144280 | 5/1998 |
| WO | 0182395 | 11/2001 |

OTHER PUBLICATIONS

Shamban B: "Busak Shamban: Soupapes A La Carte" Ingenieurs De L' Automobile, Raip, Boulogne, FR. No. 690, Jun. 1, 1994, p. 15 XP000510579 ISSN: 0020-1200.

* cited by examiner

*Primary Examiner*—Ramesh Krishnamurthy

(57) ABSTRACT

Sealing and breathing valve assembly for accumulators comprising: at least one substantially tubular collar associated to the cover of said accumulator and suitable for connecting the external environment with one or more breathing ducts made in said cover; an elastic cap of a substantially tubular shape closed by a bottom amovably coupled to the external surface of said tubular collar. Said cap has at least one first part of a substantially cylindrical surface next to said bottom with a thickness reduced with respect to the remaining part next to the bottom of said cap, said first cap having a radial elastic deformation with respect to the remaining part working as a sealing function.

6 Claims, 3 Drawing Sheets

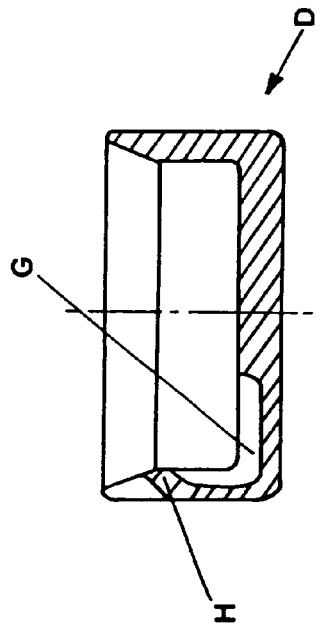
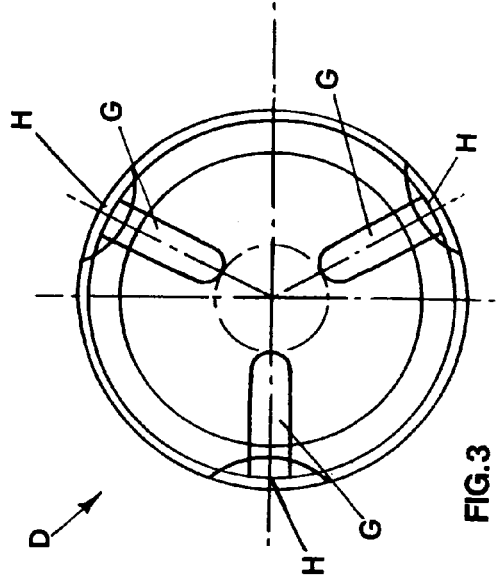
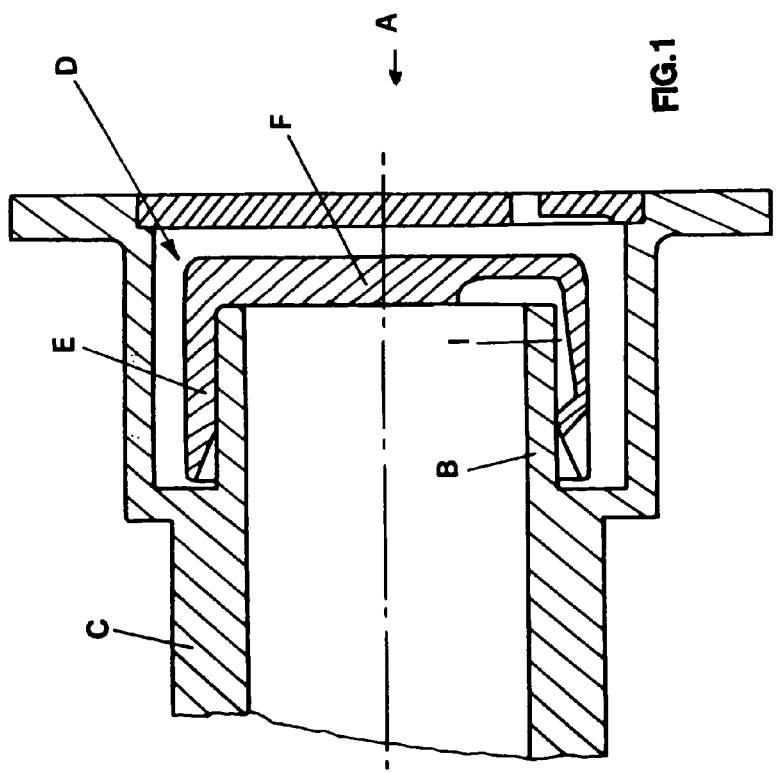

SEAL AND BLEED VALVE UNIT FOR ELECTRIC BATTERIES

BACKGROUND OF THE INVENTION

The present invention relates to a sealing and breathing valve assembly for electric accumulators.

It is known that, inside the accumulators and during their working and/or their recharge, gases due to the electrolysis and the water evaporation contained in the electrolytic solution. This, as we know, is composed by sulfuric acid and distilled water.

A particular type of accumulators are the so-called recombined accumulators, in which the gases produced during the operation are condensed internally to the accumulator by eliminating the distilled water consumption and therefore the need to top up.

For safety reasons, the accumulator of the recombined type are provided with a set of channels made in the cover closing the case containing the elements. The elements connect the various accumulator electrolytic cells with a safety valve assembly allowing the gas breathing towards the outside when they exceed a determined pressure.

The valve assembly itself must also prevent the air from entering in the accumulator when, during the cooling, the temperature, and therefore also the pressure, decreases internally.

A sealing and breathing valve assembly for electric accumulators belonging to the known technique is represented as an example title in FIG. 1, where is indicated as a whole by A.

We can see that it comprises a substantially tubular collar B protruding from the cap C of the accumulator and communicating with the internal volume of the accumulator itself. An elastic cap is applied on the accumulator, indicated as a whole by D, composed by a tubular body E closed by a bottom F.

The cap D is also represented in the FIGS. 2 and 3, where we can see it is internally provided with three grooves G placed at 120° one among another, each one is realized by groove part of the tubular body E and also part of the bottom F.

The end of the tubular body E, in correspondence with each groove G, has a lip H adhering to the tubular collar B, in order to realize the sealing.

In case of overpressure internally to the accumulator, the gas produced is discharged from inside towards the outside through the duct I represented in FIG. 1. The duct is determined between the tubular collar B and the groove G, causing the rising of the lip H and therefore the coming out of the overpressure towards the external environment.

Vice-versa, in case of depression internally to the accumulator, the external pressure forces the lips H against the tubular collar B preventing the accumulator inlet from air entrance.

A disadvantage of the valve assembly just described is that the smallness of the grooves G, and therefore of the ducts I between the cap and the tubular collar B, make the overpressure discharge and the subsequent closing difficult, therefore rising the valve assembly inertia. The valve assembly reacts very slowly, both when the pressure internal to the accumulator increases and when decreases.

This can imply that the pressure could increase over the top values allowed.

A further disadvantage is that the sealing surface is limited only to the contact surface between the cap tubular body and the tubular collar. This is not always sufficient to guarantee the sealing against the entering in the air accumulator from the external environment, when it goes to depression.

Generally, the cited disadvantages, i.e. the great opening and closing inertia to the outside and the limited sealing towards the inside, are present, in a more or less accentuated way, in all the valve assemblies belonging to the known art, even if they are built differently from the valve assembly illustrated and described.

In order to prevent some of the disadvantages cited in the prior art, the document WO 01/82395, having the name of the applicant itself, proposes a tubular body ending with a groove neck in respect with the external surface of the breathing tube collar. The latter cooperates with the internal surface of an elastic tubular cap unmovably coupled to the outside of said tubular collar.

In such a way an annular chamber is formed between the neck and the cap, allowing the pressurized gases internal to the accumulator to push the cap tubular body radially and, at the same time, on all the circumference. This makes the gas discharge towards the external easier, and therefore reduces in some way the operation inertia of the valve assembly on the whole. This prevents dangerous pressure increases internal to the accumulator, during its use.

If, on one hand, the invention proposed by the cited document overcomes some of the cited prior art disadvantages, it is also true that some disadvantages, as the operation confidence of the valve assembly on the whole, remain.

More in particular, it is not prevented that sometimes the answer time between the cap opening and closing is longer, meaning that the cap itself is not able to breathe the gas accumulated at the same pressure level. This is because the rubber, synthetic or natural, which the cap is made of adheres to the tubular collar, where it houses creating a resistance higher than the predetermined. The adhesion comes from the chemical erosion due to the gas passage during the breathing.

In substance, the breathing valves of the known art do not guarantee an operation reliability which is substantially constant along the time.

To comply with Rule 5.1 ii of PCT, the following documents are cited as closest prior art:

SHAMBAN B: 'BUSAK SHAMBAN: SOUPAPES A LA CARTE' INGENIEURS DE L'AUTOMOBILE, RAIP. BOULOGNE, FR, no. 690, 1 Jun. 1994 (1994-06-01), page 15 XP000510579 ISSN: 0020-1200

EP-A-0 756 338 (HAGEN BATTERIE AG) 29 Jan. 1997 (1997-01-29)

U.S. Pat. No. 5,455,124 (SCHOLLENBERGER GERD) 3 Oct. 1995 (1995-10-03)

PATENT ABSTRACTS OF JAPAN vol. 009, no. 049 (E-300), 2 Mar. 1985 (1985-03-02) & JP 59 191260 A (NIHON DENCHI KK), 30 Oct. 1984 (1984Oct. 30).

SUMMARY OF THE INVENTION

The aim of the present invention is to overcome the above mentioned disadvantages.

The main aim of the invention is to increase the reliability of the sealing and breathing valve assembly for electric accumulators, in order to guarantee that such a valve assembly, and in particular the cap coupled to the tubular collar, guarantees an answer time between opening and closing which is substantially the same as the valve assembly operation time.

Another aim that we want to reach is that the answer time between opening and closing is as narrow as possible, meaning that the time between the overpressure start internally to the battery and the breathing externally to the gases is the least. In this way dangerous overpressures are not accumulated internally to the battery itself.

It is equally important, in the recombined batteries, that the air does not enter from the outside towards to the battery inside and therefore that the sealing and breathing valve assembly keeps the sealing also during an eventual depression inside the battery.

The above mentioned aims, which will be better underlined below, are reached by the sealing and breathing valve assembly for electric accumulators, the main features of which are according to claim 1.

Advantageously according to the invention, the reduced thickness of the first part next to the cap bottom, allowing a great elastic deformation in case of overpressure, making easier the separation of said cap from the collar. This happens when it has adhered because of the surface deterioration due to the aging.

Equally advantageously the cap of the invention makes, in the part next to the edge, an excellent sealing keeping a substantial stiffness and a total adhesion to the collar surface when the battery is at rest. It happens so when the battery becomes cold and a depression in the battery cover breathing ducts creates.

With the same characteristics just cited the cap of the invention keeps an operation reliability which is constant along the time. Further, the answer time between breathing opening and closing is reduced, such a cap keeping substantially the same own operating characteristics along the time.

BRIEF DESCRIPTION OF THE DRAWINGS

Further characteristics and features of the invention will be better underlined in the description of two preferred embodiments of the invention, given as an indicative but not limitative title and illustrate in the attached drawings, where:

FIGS. 1, 2 and 3 represent different views of a sealing and breathing valve assembly for electric accumulators belonging to the prior art;

DESCRIPTION OF THE INVENTION

Figure 5:
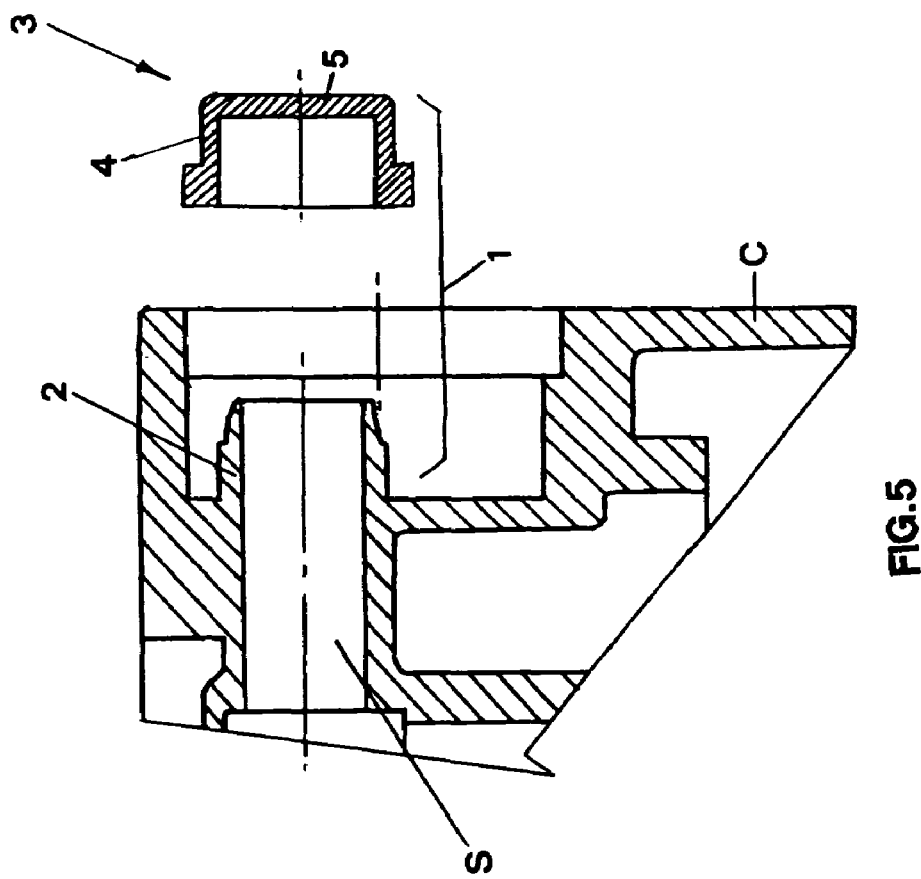
FIG. 5 represents the valve assembly of FIG. 4 in an exploded view.
Figure 4:
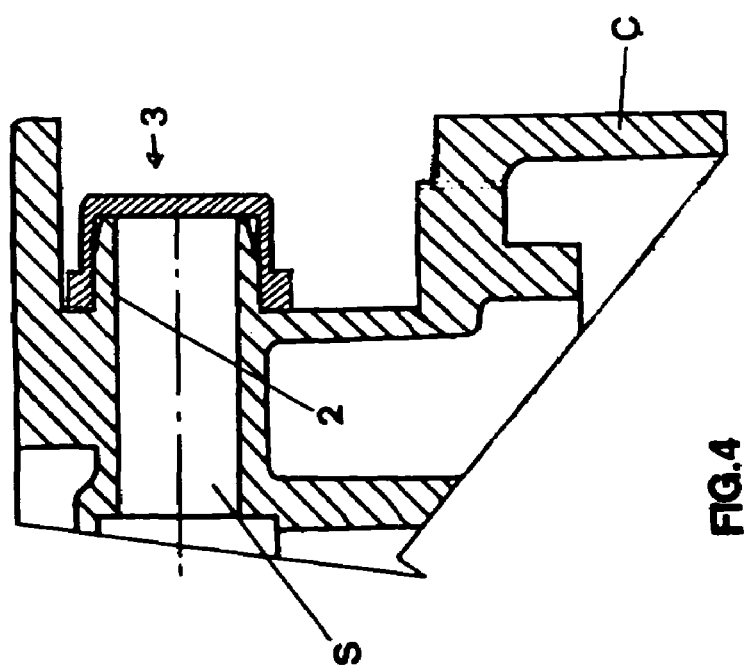
FIG. 4 represents the valve assembly of the invention in a longitudinal section.

As it can be seen in FIGS. 4 and 5, the valve assembly of the invention, indicated as a whole by 1, is applied to the cover C of an accumulator, to the end of one or more breathing ducts S connecting the various cells of the accumulator to the external environment.

According to the invention, the elastic cap 3, plastic-made and with a high elasticity or by elastomer, better visible in the enlargements in FIGS. 6–9, has in the tubular part 4 a first substantially cylindrical surface part, next to its own bottom 5. This part has a thickness T1 reduced with respect to the thickness T2 of the remaining part 42 next to the edge 43 of the cap 3.

Figure 6:
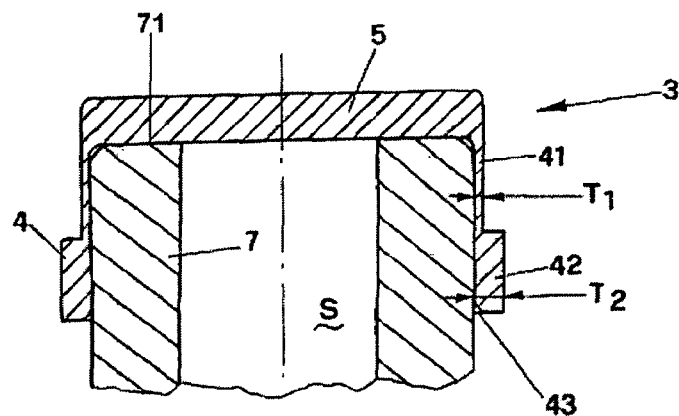
FIGS. 6 and 7 represent an enlargement of the valve assembly of the invention in two different operating steps.
Figure 7:
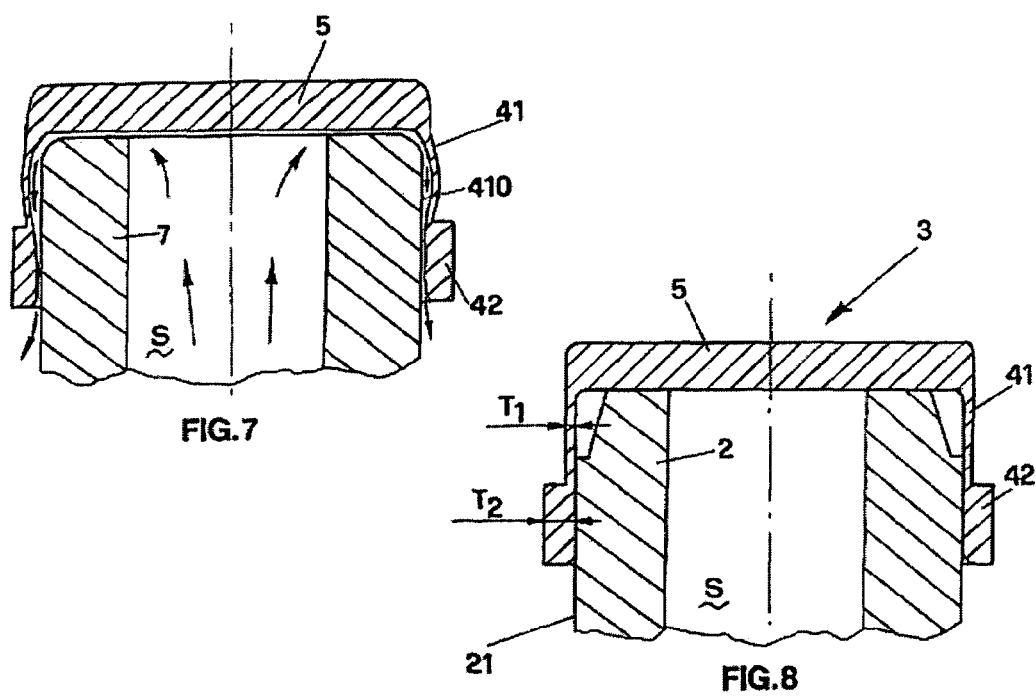

Both the cylindrical part with a thickness T1 reduced and the following part with a thickness T2 of said elastic cap, in the case of the example of FIG. 6, adhere to the external surface of the breathing collar 7.

It is clear that the first part 41 has a radial elasticity higher than that of the remaining part 42, because of the reduced thickness. Therefore, as it can be seen in FIGS. 7 and 9, when, inside the accumulator, an overpressure reaching the duct S in order to be externally breathed is heard, such an overpressure easily deforms the walls 41 of the cap 3. Thereby, a first separating area 410, in respect with the external surface 21 of the collar 2, is created.

This makes intuitively easier the creation of a gas preferred way which then breathes easily outside.

It is clear that also the thickness T2 of the part next to the edge indicated by 42 creates a sure sealing area, so that the specific shape of the elastic cap 3 guarantees an operating reliability which is substantially constant along the time.

The special conformation, with a slightly reduced cap thickness, therefore allows a sure separation of the cap itself during the overpressure and therefore a valve assembly opening and closing answer time which is certain and substantially the same.

It is also important to clear that, when the battery is at rest, a depression internal to the tubular duct 7 is created because of the battery cooling. It is therefore important that the elastic cap assures the sealing, in order to prevent the air to enter in the battery. This is possible thanks to the cap adherence both to the cylindrical wall 7 and to the edge 71 of the collar where the bottom 5 of the cap 3, according to a circular ring, leans.

We can see that the elastic cap application, with the characteristics of the invention, depends only partially on the collar external conformation. In fact, in FIGS. 6 and 7 a collar with a substantially cylindrical section is drawn, indicated by 7, while in FIGS. 8 and 9 a tubular collar 2 with a tapered end is shown. This cone has a truncated cone section 22 creating, together with the cap 3, a chamber where the gas, before exerting an expansion radial power of the thin thickness part 41, accumulates.

About the characteristics of the cap shape, we can see that it has preferably, but not necessarily, a length of the part 41 with a reduced thickness which is equal or greater than the remaining part 42.

Further, referring to the thickness T1 of the part 41, this will be preferably, but not necessarily, equal or greater to half a thickness T2 of the part 42.

Figure 8:
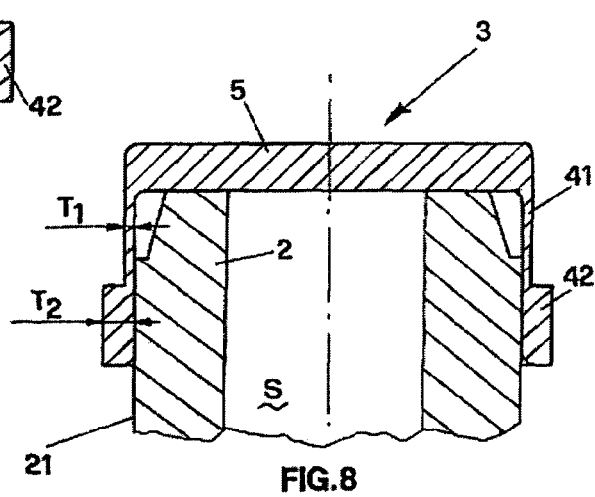
FIGS. 8 and 9 represent two different operating steps of a valve assembly presenting a collar with a different shape from FIGS. 6 and 7.
Figure 9:
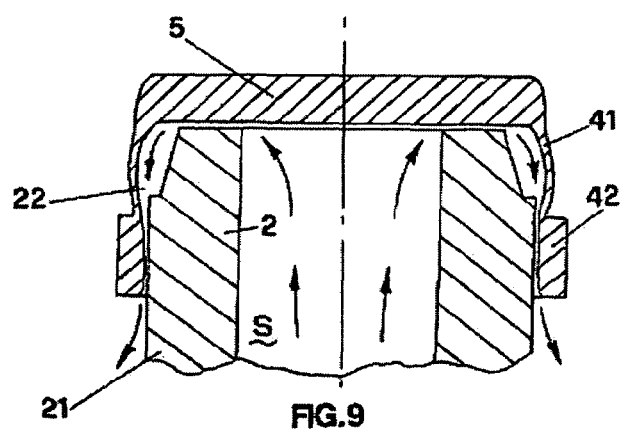

When the battery is at rest, the cap of FIG. 8 assures the sealing both with the cylindrical surface, which is in touch with the cylindrical surface of the tubular collar 2, and with the bottom surface 5, which is in touch with the annular edge 23 of the collar 2.

According to the previous description, we can see that the invention reaches all the prefixed aims.

The invention described can foresee further executive variations, referred to, for example, different shapes of the elastic cap and/or of the tapered neck of the tubular collar.

The invention claimed is:

1. A sealing and breathing valve assembly for electrical accumulators, comprising:
   at least one substantially tubular collar, associated to a cover of said accumulator and suitable for connecting the external environment with one or more breathing ducts made in said cover;
   an elastic cap coupled to the external surface of said tubular collar, the cap having a closed end, an open end and a tubular side section, said side section comprising first and second cylindrical parts abutting to each other, the wall thickness of the first part contiguous to the closed end being thinner than the wall thickness of the second part contiguous to the open end, the wall thickness of the first part is the same along its whole circumference and the wall thickness of the second part is the same along its whole circumference and both parts have inner surface portions in contact with the outer surface of said collar, said cap seals the tubular collar with its bottom surface and with the inner surface portion of the side section.

2. A valve assembly according to claim 1, wherein said first part with a reduced thickness has a length equal to or greater than that of the second part.

3. A valve assembly according to claim 1 wherein the reduced thickness of said first part of said cap is equal to or greater than half a thickness of the second.

4. A valve assembly according to claim 1 wherein at least one substantially tubular collar associated to said cap has a substantially cylindrical shape.

5. A valve assembly according to claim 1 wherein said at least one substantially tubular collar associated to said cap has a substantially tubular shape with a beveled or reduced edge, forming an annular space between said cap and said collar.

6. A sealing and breathing valve assembly for electrical accumulators, having a cover formed with a breathing duct therein in communication with the interior of the cover comprising:

a substantially tubular collar having an outer wall surface engaging the cover, the collar having an inner through opening in communication between the breathing duct and the with the environment and an open end;

an elastic cap comprising a cylindrical wall having a closed end, an open end, the cylindrical wall including first and second cylindrical contiguous portions each having a corresponding uniform wall thicknesses; the first portion being adjacent to the closed end and the second portion being adjacent the first portion; the wall thickness of the first portion being thinner than the wall thickness of the second portion; the first and second portions each having a corresponding inner surface for engaging and sealing the outer surface of the collar, and the closed end of the cap engaging and sealing the open end of the collar.

* * * * *